May 15, 1951     C. A. BOWLUS     2,552,514
MACHINE FOR INDUCTIVELY WELDING SEAMED TUBING
Filed Feb. 3, 1949     2 Sheets-Sheet 1

INVENTOR.
Claude A. Bowlus.
BY Stanley Lightfoot
Attorneys

May 15, 1951

C. A. BOWLUS 2,552,514

MACHINE FOR INDUCTIVELY WELDING SEAMED TUBING

Filed Feb. 3, 1949

INVENTOR.
Claude A. Bowlus.
BY
Stanley Lightfoot
Attorney.

Patented May 15, 1951

2,552,514

UNITED STATES PATENT OFFICE 2,552,514

MACHINE FOR INDUCTIVELY WELDING SEAMED TUBING

Claude A. Bowlus, Detroit, Mich.

Application February 3, 1949, Serial No. 74,331

12 Claims. (Cl. 219—6)

This invention relates to apparatus for the seam welding of articles such as tubes, being primarily intended for the welding of the longitudinal seam of tubing which has been formed from flattened strips of metal by spacing such strips through dies or forming rolls whereby the longitudinal edges are brought into abutting, or practically abutting relation to one another, resulting in a seam which it is designed to weld to complete the tube.

This is a continuation-in-part of my application Serial No. 519,551, filed January 24, 1944, now abandoned.

It is an object of the said invention to provide novel means for effecting the welding of such a seam by the use of electric magnets arranged and excited to provide a pulsating magnetic flux, the frequency of which pulsations as regards their heating effect upon the tube outward, resulting, at least in part, from the rapid and consecutive approach and withdrawal of such magnets to and from the work.

It is also an object of the invention to provide means whereby the magnets operating in the manner referred to, progressively travel along the seam of the work (or the seam of the work being progressively advanced relative to the path of the said magnets), whereby a line welding action may be obtained.

More particularly, the invention proposes to provide welding apparatus of the type referred to characterized by a plurality of energized poles on a rotary armature arranged to be successively brought into and out of juxtaposition with a seam to be welded, as the armature and the work are moved relative to each other, whereby inductive heating will take place progressively, as a result of these motions along the work seam.

I am aware that heating or welding devices have been heretofore proposed in which a series of work pieces are each separately and individually brought into alignment with individual electro-magnets, each performing its heating function on a work unit entirely independently of the operation of any of the other series of magnets or pieces of work. In these prior devices the movement of the work and of the magnets is synchronized. In applicant's present device there is no such synchronizing, but on the contrary, synchronizing is avoided and by so doing a heating effect is produced by setting up a hysteresis current in the work in response to an arcuate movement over the surface of the work of all pieces in rapid succession, which effect may be further energized by the use of alternating current in exciting the magnets, if though necessary or desirable, although this is by no means essential.

Thus a characteristic of this invention is that the poles of the armature may be said to successively "wipe" the surface of the work, even though they do not actually contact such surface.

Still further, the said invention aims to provide a heating or welding device having a rotary armature in which a plurality of magnetic poles press successively into and out of close proximity to the work, as, for instance, to the seam of a tube, the timing of the speed of the armature and the movement of the tube or work being such that the successive approach of the poles of the armature to the seam of the tube may be overlapping in such manner as to produce a continuous weld.

Applicant's device also admits of an arrangement wherein the frequency of electric pulsations may be varied with the speed of the field to arrive at a frequency most effective for the particular welding or heating being effected.

Generally speaking, the invention may be said to reside in an electric heat generator of novel design, in which the energy produced, aside from the losses normal to a rotating mechanism, is entirely converted to heat at the edges of the seam of the tube or work as such work passes closely under the rotating poles of an armature excited by an external source of direct or alternating current.

As such a device may be free of electrical contacting members and the transfer of energy be mainly by electro-magnetic induction only, the heat necessary for welding (in combination with pressure where desired) is generated almost entirely in an area of greatest value and maximum economy.

Other objects and advantages of my invention will become more fully apparent in the following description, by way of examples, in which reference will be had to the accompanying drawings, wherein.

Figures 1, 7:
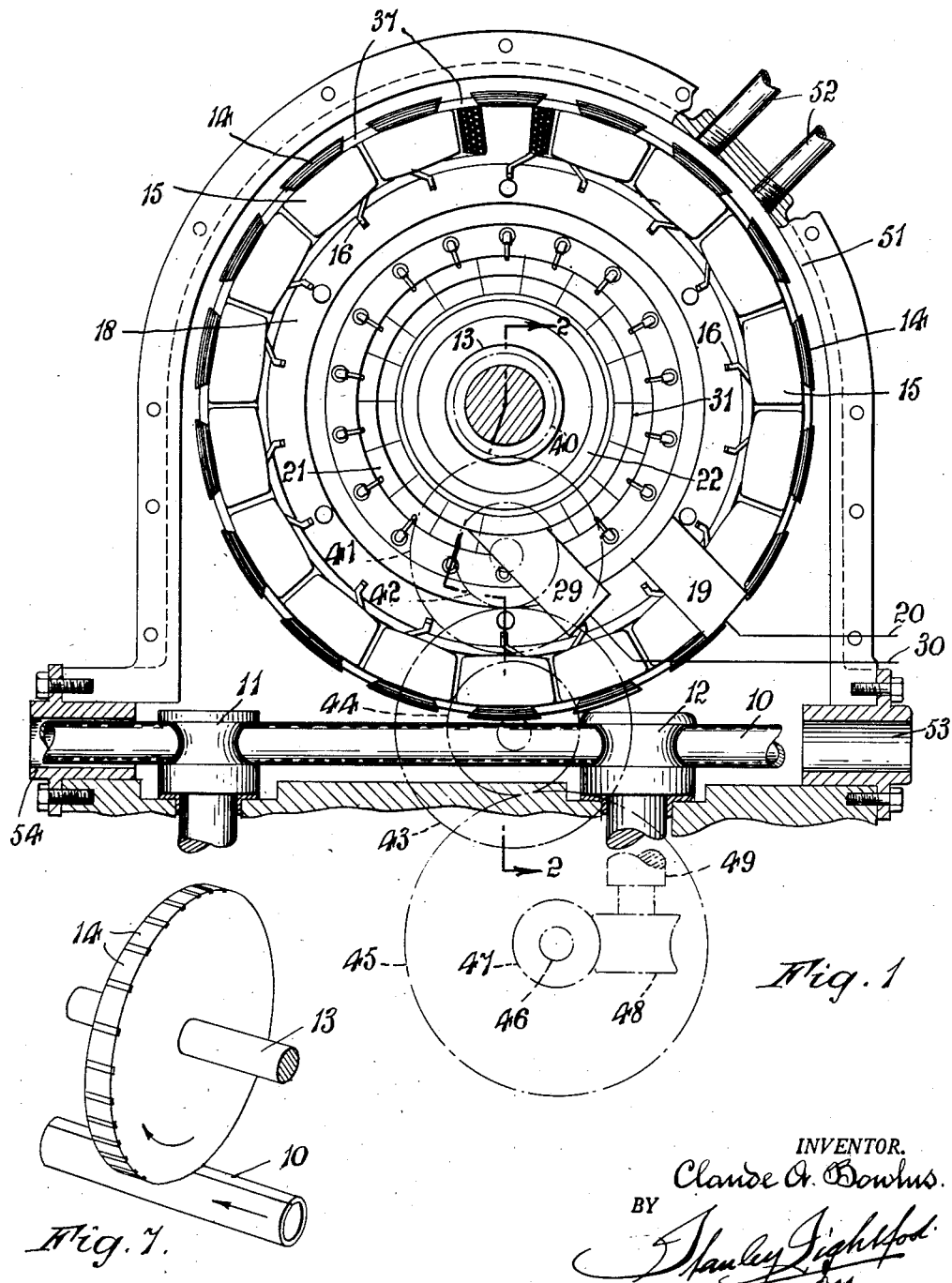
Figure 1 is an elevation partially diagrammatic and showing the work in operative relation to the principal elements of the machine, the uppermost winding being shown in cross-section.
Figure 7 is a diagrammatical perspective view showing an arrangement wherein the rotary armature is at an angle to the work seam to be welded.

Referring to the drawings in which a preferred construction is shown in Figure 1, the flattened strip, or skelp 10 is formed into a tubular form with the open seam turned upwardly by being drawn through forming apparatus including a plurality of power-driven abutting field rolls 11, having annular grooves adapted to produce the said tubular form.

Spaced at a distance from the said forming feed rolls 11 is another plurality of abutting rolls 12, which may also be power-driven if desired, said rolls 12 also having annular grooves adapted to receive the tubular form of strip resulting from the forming action of said forming rolls 11. Said second pair of rolls 12 are arranged with bearings which may be in any well-known manner adjustable in position so as to enable spacing in a direction diametrical to the axis of said tubular skelp, and thereby to impart pressure to the walls thereof on opposite sides of the seam.

Journaled above the work 10 and rotating on an axis transverse of the axis of said work as by being mounted in suitable bearings, as at 50 is a rotatable shaft 13 which carries the elements of an armature having a plurality of peripheral magnetic poles 14, each having an insulated electrically conducting wound coil 15 around same with ends 16 and 17.

The end 16 of each coil 15 is secured in a milled slot in the periphery of an annular flanged common conductor 18 concentric with said shaft 13 and electrically insulated from other rotating elements of said armature. Said annular common conducting member 18 makes continuous contact with the stationary brush 19 of conducting material, which is in turn supplied with current from one of the exciting current supply lines 20.

The end 17 of each coil 15 is connected to a segment 21 of the annular commutator secured on the armature shaft 13 and concentric therewith. Said commutator consists in this instance of the threaded annular collar 22, the electrical insulating members 23 and 24, and the plurality of segments 21 referred to. The said segments 21 are of electrically conducting material and are provided with an outwardly projecting portion having a milled slot which forms a seat for the end 17 of coil 15.

Said segments 21 are each provided with a dovetail which fits at one end against the insulating member 23 which, in turn, fits against the internally conically formed seat of collar 22. Said dovetail is clamped at the opposite end by the second insulating member 23 and the threaded annular clamp nut 25 which has a mating internally conically shaped surface adapted to fit the end of said dovetail.

It is also to be noted that segments 21 are insulated one from another and also from the field laminations 26 by the insulating members 27 and 28.

The commutator assembly is machined to a cylindrical surface 31, which is in continuous contact with the metallic brush member 29 and is thereby connected to the line 30 from the same source of electric current as line 20. Inasmuch as the said cylindrical surface 31 of the commutator is formed by that of the plurality of segments 21, it is evident that, during such period as the said commutator's segments are in contact with the said metallic brush member, current thereby may be supplied to each coil 15 selectively while such a contact is established only through brush 29.

Figure 2:
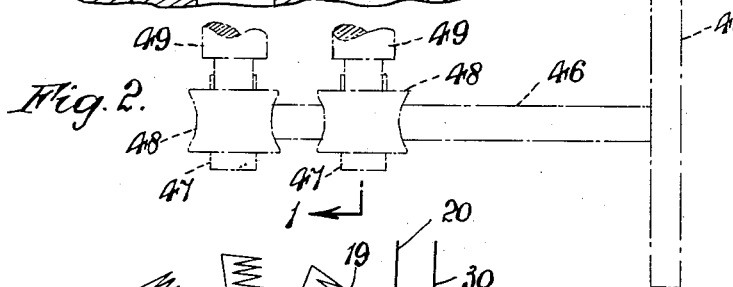
Figure 2 is a fragmentary and cross-sectional view on line 2—2 in Figure 1, showing the relation between the principal parts of the rotating members.

Referring to Figure 2, the pole piece 14 is shown in section linked by the turns of coil 15 and extending from the main central portion 32 of the series of metallic laminations 26 (forming the common body of the magnetic field) which central portion 32 is mounted on the hub 33 of the driving and mounting collar 34 and secured thereto by a number of rivets 35. Said driving and mounting collar 34 is bored to fit closely to shaft 13 and is provided with a key 36 which serves to transmit torque from said shaft 13 to driving collar 34.

The rivet 35 is upset to hold said laminations securely in place and also there is provided in the insulating member 28 a recess for each rivet 35 which allows said insulating member 28 to abut evenly against said laminations 26. Said insulating member 28 is further provided with a series of recesses for the rivets 37 which secure the annular flanged common conductor 18 with said rivets electrically insulated from said laminations 26.

It is to be noted that the poles 14 are free to rotate in close physical relation to the wall of the work, in this case the tube 10, which normally is so oriented between the rolls 11 and 12 that the open seam may move freely under the armature and through the said magnetic field.

Rotation of said magnetic field in close physical relation to the edges of the formed tube produces variations of magnetic field intensity in the edges of said open seam tube, and thereby the electric current and the heat required to cause welding of the tube at the seam as the said tube passes through the rolls when same are set for the proper pressure.

Figure 3:
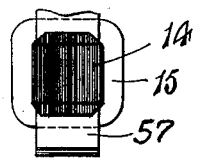
Figure 3 is a view of one of the magnetic poles of the machine as viewed looking directly at the face thereof.

Referring to Figure 3, the exposed laminations of a pole 14 are shown with the coil 15 in place and secured by the retaining wedges 57 which are driven between the said poles, as shown in Figure 1.

Figure 4:
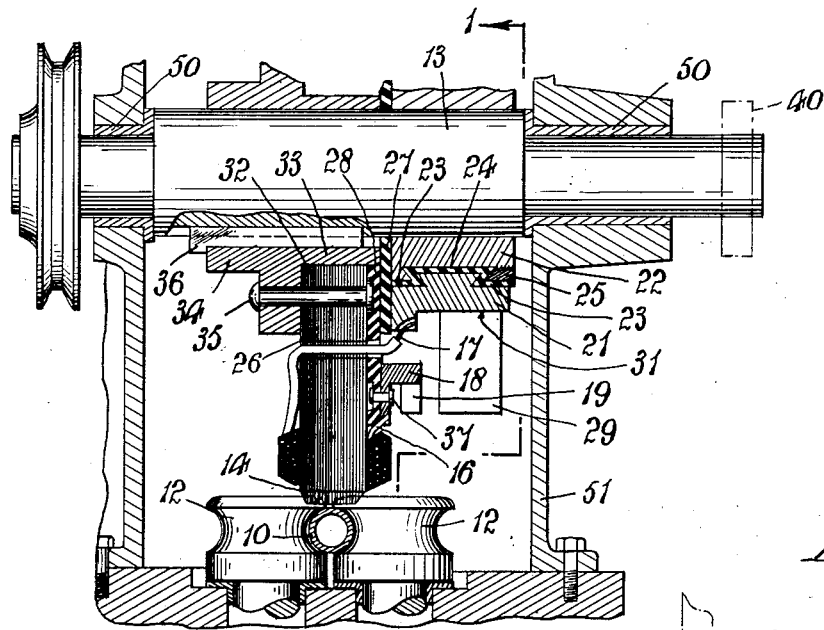
Figure 4 is a cross-sectional view of the typical tube formed by the machine substantially as same appears just previous to the final operation before entering the feeding and squeezing rolls.
Figure 4:
Figure 5:
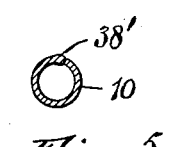
Figure 5 is a section of the finished tube after welding.

In Figure 4, the tube 10 is shown in section with an opening 38 between the abutting edges of the skelp as formed by the forming rolls 12 of Figures 1 and 2. In Figure 5, the tube 10 is shown in section after welding with a thickened wall 38 caused by the pressure of the forming rolls and the welding effect of the rotating magnetized poles 14.

Figure 6:
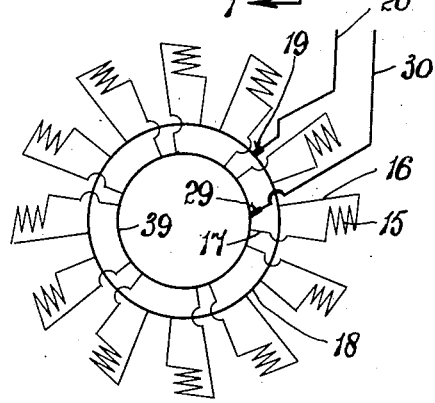
Figure 6 is an electrical diagram showing an alternate method of connecting the pole windings in a continuous circuit.

Referring to Figure 6, the coils 15 are shown in an alternate arrangement in which the coil end 16 is in all cases connected to the common conducting ring 18 and having the opposite end 17 connected to another common conducting ring 39. Said conducting rings 18 and 39 respectively make continuous contact with brushes 19 and 29, which in turn are electrically connected to the lines 20 and 30 from a source of electrical energy. This arrangement may be less economical in power usage but has the advantage of avoiding the making and breaking of the electrical exciting circuit for each coil during each revolution of the armature.

In order to correlate the rotary speed of the armature with the lineal feed of the work, I show, schematically, a train of chain speed gears 40, 41, 42, 43, 44 and 45, transmitting power from the shaft 13 to a shaft 46, which is provided with worm pinions 47 in mesh with worm pinions 48 mounted on a shaft 49 of the feed rolls 12. This train of gears is for the purpose of effecting a slow lineal feed of the tube or work 10 beneath the rapidly revolving poles 14 of the armature, whereby the work piece 10 may be said to be "relatively stationary" to the circular travel of the pole pieces 14 of the armature. The gears of the train will be chosen to effect a feed of the work which is most desirable according to the size of the armature, its rotary speed, and the number of poles provided, and also according to the nature of the current utilized and exciting the magnetic poles.

It will be clear that the armature may be revolved at a speed which will determine the frequency of magnetic impulses to which the tube is subjected throughout a given length of the work, and that these impulses may be of such a high frequency as to produce the desired heating effect in that area. It will also be apparent that the frequency of these impulses may be a function both of the frequency of the approach and removal of the magnetic poles to and from the work in addition to the frequency of the current exciting the poles where alternating current is used for that purpose. Otherwise, where direct current is utilized, the frequency may be that of the actual successive passing of the poles over the work.

In the drawing the armature is shown as being housed in a casing 51 carrying the adjustable bearings 50 and provided with gas inlets 52 through which hydrogen, for instance, may be admitted to the housing. 53 and 54 are the bushings through which the work may be passed beneath the commutator.

It will be apparent that in the present device the field is alternating and is set up by a plurality of rotating pole pieces so that the currents are concentrated at the nearest edges of the work seam, which may or may not be entirely closed. In the case of work of the type of a tube the heat will be applied selectively to the edges of the skelp because the curvature of the tube will present only such edges of the skelp to the most intense part of the field.

While, for the sake of simplicity, I illustrate a single armature, it will be obvious that this system would admit the use of two or more armatures, if though necessary or desirable.

It will also be apparent that while, in Figures 1 and 2, the armature is shown as revolving in a plane aligned with the seam of the work, the said armature may revolve in a plane at an angle to such seam as, for instance, in Figure 7 wherein the armature is shown to be at right angles to the seam. Obviously, in this case the poles 14 successively approach and recede from the work and the magnet pulsations are the result of such motion of the poles either alone or in conjunction with interrupted excitation of the magnets, as the case may be.

It is not my invention to confine the scope of the invention to the constructions herein shown as preferred or any alternate thereof, because I am well aware that the electro-magnetic field can be used in combination with non-oxidizing gases and that more than one such rotating magnetic field can be used in welding tubes having more than one seam, also that the electric generator herein described can be used in close proximity with airplane sheet metal or armor plate for heat treating the surface of same, or for heat treating the surfaces of crankshafts and a multitude of similar parts, without limiting my invention other than by the appended claims.

This invention may be developed within the scope of the following claims without departing from the essential features of the said invention, and it is desired that the specification and drawings be read as being merely illustrative of a practical embodiment of the invention, and not in a strictly limiting sense.

What I claim is:

1. In apparatus for inductively heating a work piece, means for holding the work piece, means for subjecting the work piece while so held to the rapid approach and withdrawal motions of a successive series of magnetic fields, said means comprising a rotatable armature having a plurality of magnetic poles arranged around the periphery thereof for successive arcuate movement past the surface of said work piece, and means for rotating said armature at a speed whereby said poles traverse the work piece in rapid succession.

2. Apparatus for inductively heating a work piece comprising, in combination, a rotatable armature having a plurality of magnetic poles arranged around the periphery thereof and moving in a circular path, and means for mounting said work piece in close proximity and relatively stationary to said circular path and within the path of movement of the magnetic fields of said poles, and means for rotating said armature at a continuous high speed whereby said piece is traversed in rapid succession by the magnetic fields of successive poles on said armature.

3. Heating apparatus according to claim 1 and including work feed means for producing a relatively slow movement of said work to the peripheral speed of said armature whereby the fields of said poles will successively traverse progressive sections along said work piece.

4. Apparatus for inductively heating a work piece comprising, in combination, a rotary armature having a plurality of magnetic pole pieces mounted for movement in a closed path, feed means for moving said work piece in close proximity to said closed path and within the path of movement of the magnetic fields of said poles, and means for rotating said armature at a continuous high speed whereby said piece is traversed by a rapid succession of approaching and retracting magnetic fields of successive poles moving around said closed path.

5. Heating apparatus according to claim 1 wherein said work piece comprises an elongated piece, and including means for moving said work piece axially thereof to move different linear sections of said piece into the path of movement of the magnetic fields of said poles.

6. Heating apparatus according to claim 1 wherein said work piece comprises a tubular form having a longitudinal slit therein and positioned to face said armature, and including means for producing relative movement between said tubular form and said armature to bring different linear sections of said tubular form into inductive relation with said armature.

7. In a machine for welding together the adjacent edges on opposite sides of a longitudinal slit in a tubular form, the combination of a rotary armature having a plurality of magnetic poles distributed around the periphery thereof, and means for supporting said tubular form within the path of movement of the magnetic fields of said poles and with said slit facing said poles, whereby each pole in turn approaches said form to inductively heat the same for a predetermined period of time and thereafter moves away from said form for a longer interval of time.

8. In a machine for welding together the adjacent edges on opposite sides of a longitudinal slit in a tubular form, the combination of a rotary armature having a plurality of salient magnetic poles distributed around the periphery thereof, and means for moving said tubular form axially thereof and closely adjacent the path of movement of said pole pieces, said tubular form being oriented so that the edge portions on opposite sides of said longitudinal slit face said pole pieces.

9. In a machine for welding together the adjacent edges on opposite sides of a longitudinal slit in a tubular form, the combination of a laminated field structure comprising a stack of stampings each of an annular conformation with a plurality of portions projecting radially as equally spaced circumferential points and being of equal radial length, a shaft, means mounting said field structure firmly upon said shaft and securing said stampings snugly together, a magnetizing winding surrounding each stack of radially projecting portions, and means for moving said tubular form adjacent the path of the moving pole tips to be heated by brief exposure to each of the pole tips successively so that said pole tips do not become overheated.

10. Apparatus for inductively heating a work piece comprising, in combination, a rotatable armature having a plurality of magnetic poles arranged around the periphery thereof and moving in a circular path, and means for mounting said work piece in close proximity to said circular path and within the path of movement of the magnetic fields of said poles, whereby said piece is traversed by the magnetic fields of successive poles on said armature, each of said magnetic poles being provided with a magnetizing winding and including means for successively energizing and deenergizing each winding as the associated pole approaches and leaves the work piece.

11. Apparatus for inductively heating a work piece having an elongated area to be heated comprising, in combination, a rotatable armature having a circular series of peripheral magnetic poles for movement in a circular path, feed means for passing said area of said work longitudinally in close proximity to said circular path and within the path of movement of the magnetic fields of said poles, and a speed reduction transmission coupling said armature with said feed means for effecting a relatively slow passage of said work through said rapidly rotating magnetic fields.

12. Apparatus for inductively heating a work piece having an elongated area to be heated comprising, in combination, a rotatable armature having a circular series of peripheral magnetic poles for movement in a circular path, feed means for passing said area of said work longitudinally in close proximity to said circular path and within the path of movement of the magnetic fields of said poles, and means correlating the rotary speed of said armature with the lineal feed speed of the work at a rate whereby the work is subjected to a progressively overlapping heating influence of the series of successive poles along the elongated area of said work.

CLAUDE A. BOWLUS.

REFERENCES CITED

The following references are of record in the file of this patent:

UNITED STATES PATENTS

| Number | Name | Date |
|---|---|---|
| 1,749,700 | Fourment | Mar. 4, 1930 |
| 1,885,966 | Viry | Nov. 1, 1932 |
| 1,915,047 | Blakeslee | June 20, 1933 |
| 1,932,423 | Sessions | Oct. 31, 1933 |
| 2,184,280 | Clark | Dec. 26, 1939 |
| 2,237,309 | McMinn | Apr. 8, 1941 |

FOREIGN PATENTS

| Number | Country | Date |
|---|---|---|
| 363,323 | Great Britain | June 10, 1930 |

OTHER REFERENCES

Dawes: "Electrical Engineering," vol. 1, Direct Currents, first edition, fifth impression, 1920, McGraw-Hill Book Co., Inc., New York, page 246.

Timbie et al.: "Principles of Electrical Engineering," first edition (copyright 1922). John Wiley and Sons, Inc., New York, page 344.